US006800577B2

(12) United States Patent
Mailadil et al.

(10) Patent No.: US 6,800,577 B2
(45) Date of Patent: Oct. 5, 2004

(54) MICROWAVE DIELECTRIC CERAMIC COMPOSITION OF THE FORMULA XMO-YLA$_2$O$_3$-ZTIO$_2$ (M=SR, CA; X:Y:Z=1:2:4, 2:2:5, 1:2:5 OR 1:4:9), METHOD OF MANUFACTURE THEREOF AND DEVICES COMPRISING THE SAME

(75) Inventors: Thomas Sebastian Mailadil, Kerala (IN); Santha Narayana Iyer, Kerala (IN); Isuhak Naseemabeevi Jawahar, Kerala (IN)

(73) Assignee: Council of Scientific and Industrial Research, New Delhi (IN)

( * ) Notice: Subject to any disclaimer, the term of this patent is extended or adjusted under 35 U.S.C. 154(b) by 219 days.

(21) Appl. No.: 10/101,504

(22) Filed: Mar. 20, 2002

(65) Prior Publication Data

US 2003/0181312 A1 Sep. 25, 2003

(51) Int. Cl.$^7$ .......................... C04B 35/465; H01P 7/10; H01G 4/12; H01Q 1/00
(52) U.S. Cl. ................. 501/136; 361/321.5; 333/219.1; 343/785; 343/907
(58) Field of Search ...................... 501/136; 361/321.5; 333/219.1; 343/785, 907

(56) References Cited

U.S. PATENT DOCUMENTS

| | | | |
|---|---|---|---|
| 4,670,409 A | | 6/1987 | Okawa et al. |
| 5,569,632 A | * | 10/1996 | Jung et al. .................. 501/136 |
| 6,319,871 B1 | * | 11/2001 | Sato et al. .................. 501/139 |
| 6,385,035 B1 | * | 5/2002 | Matoba et al. ........... 361/321.1 |

OTHER PUBLICATIONS

Herman et al, CAPLUS 1984:57428, "Hexagonal perovskite phases . . . ".*
Pivovarova et al, "Inorganic Materials", vol. 35, No. 12, no month provided, 1999, pp. 1288–1290, XP008011028.
Nanot et al, :J. Solid State Chem., vol. 11, No. 4, no month provided, 1974, pp. 272–284, XP008011027.
Vineis et al, Materials Research Bulletin, vol. 31, No. 5, no month provided, 1996, pp. 431–437, XP002222068.

* cited by examiner

*Primary Examiner*—David Brunsman
(74) *Attorney, Agent, or Firm*—Nixon & Vanderhye, P.C.

(57) ABSTRACT

A microwave dielectric ceramic composition comprises a composition of the formula xMO-yLa$_2$O$_3$-zTiO$_2$ wherein M is selected from Sr and Ca and x:y:z=1:2:4, 2:2:5, 1:2:5, 1:4:9.

23 Claims, 6 Drawing Sheets

Fig. 1 The variation of resonant frequency with temperature for $CaLa_4Ti_4O_{15}$ Fig. 2 The variation of resonant frequency with temperature for $Ca_2La_4Ti_5O_{18}$ Fig. 3 The variation of resonant frequency with temperature for $SrLa_4Ti_4O_{15}$ Fig.4 The variation of frequency with temperature for $CaLa_4Ti_5O_{17}$ Fig.5 The variation of frequency with temperature for $CaLa_8Ti_9O_{31}$

MICROWAVE DIELECTRIC CERAMIC COMPOSITION OF THE FORMULA XMO-YLA$_2$O$_3$-ZTIO$_2$ (M=SR, CA; X:Y:Z=1:2:4, 2:2:5, 1:2:5 OR 1:4:9), METHOD OF MANUFACTURE THEREOF AND DEVICES COMPRISING THE SAME

FIELD OF THE INVENTION

The present invention relates to a set of novel microwave dielectric ceramic compositions xMO-yLa$_2$O$_3$-zTiO$_2$ (M=Sr, Ca; x:y:z=1:2:4, 2:2:5, 1:2:5 or 1:4:9) and devices comprising the same.

BACKGROUND OF THE INVENTION

The dramatic developments in the microwave integrated circuit technology have revolutionized the field of telecommunications. Dielectric resonators (DRs) are key components in MIC technology that increasingly replace the conventional metallic cavity resonators and microstrip circuits. The size of the microwave circuit is inversely proportional to the square root of its dielectric constant. A DR should have high dielectric constant (for miniaturization), high quality factor (for frequency selectivity) and low temperature coefficient of resonant frequency (for frequency stability). These constraints usually limit the DR applicability to only those ceramics with $\epsilon_r$=20–100, Q>2000 and $\tau_f$<±20 ppm/° C. Compared to the use of alumina substrates, low loss high dielectric constant materials decrease the size not only for strip line resonators and filters but also for all microwave circuits. It is also possible to use these dielectric materials in the fabrication of devices such as circulators, phase shifters etc. for impedance matching. The DRs are used for the manufacture of microwave oscillators, filters and dielectric resonator antennas for satellite and personnel communication applications. They are also used for applications such as telemetry and tracking.

Conventional microwave ceramics fall into categories. (1) Ceramics with low permittivity (20<$\epsilon_r$<40) with high quality factor (Qxf>50000 GHz) such as Ba(Mg,Ta)O$_3$, Ba(Zn,Ta)O$_3$, Ba(Mg,Nb)O$_3$, Ba(Zn,Nb)O$_3$, their solid solution modifications, Ba(Mg,Sn,Ta)O$_3$, Ba$_2$Ti$_9$O$_{20}$ and (Zr,Sn)TiO$_4$. (2) Ceramics with high permittivity ($\epsilon_r$>75) and low Q factor (Qxf<10000 GHz) such as tungsten bronze type BaO—RE$_2$O$_3$—TiO$_2$ (1:1:4 and 1:1:5) and Ba$_{6-3x}$Ln$_{8+2x}$Ti$_{18}$O$_{54}$ where Ln is La$^{3+}$, Nd$^{3+}$, Sm$^{3+}$ and Gd$^{3+}$. The first group of ceramics are usually employed at frequencies >1.5 GHz where as the second group at frequencies <2 GHz. For applications at <2 GHz, though ceramics with $\epsilon_r$≧70 can provide greater miniaturization, due to the requirements of narrow bandwidth and extremely low insertion loss (<0.3 dB) ceramics with even $\epsilon_r$=38 are used by compromising size. Hence further miniaturization of devices require low $\tau_f$ ceramics with $\epsilon_r$>45 and Qxf>45000 GHz. [B. Jancar, D Suvorov, M. Valent, "Microwave dielectric properties of CaTiO$_3$—NdAlO$_3$ ceramics", J. Mater. Sci. Letters 20 (2001), 71–72]. Two different methods are used in this regard. (1) The formation of solid solutions between high Q ceramics with $\epsilon_r$ in the range 20 to 40 and having reasonably high $\tau_f$ with ceramics of opposite $\tau_f$ (usually positive), high $\epsilon_r$ (>100) and low loss such as CaTiO$_3$, TiO$_2$, SrTiO$_3$, BaTiO$_3$ etc. (2) Explore the microwave dielectric properties of Ba$_5$Nb$_4$O$_{15}$ type cation deficient hexagonal perovskites. [H. Sreemoolanadhan, M. T. Sebastian and P. Mohanan, Mater. Res. Bull, 30(6) 1995, pp 653–658, C. Veneis, P. K. Davies, T. Negas and S. Bell, Mater. Res. Bull 31(5) 1996 pp 431–437 and S. Kamba, J. Petzelt, E. Buixaderas, D. Haubrich and P. Vanek, P. Kuzel, I. N. Jawahar, M. T. Sebastian and P. Mohanan, J. Appl. Phys 89(7) 2001, pp 3900–3906]. The cation deficient provskites reported such as Ba$_5$Nb$_4$O$_{15}$ and Ba$_{5-x}$Sr$_x$Nb$_4$O$_{15}$, are having dielectric constant between 40 and 50 and high quality factor, but their high $\tau_f$ make them not suitable for practical applications. The isostructural BaLa$_4$Ti$_4$O$_{15}$ and Ba$_2$La$_4$Ti$_5$O$_{18}$ have high dielectric constant (43 and 46), high quality factor with low temperature coefficient of resonant frequency. [C. Veneis, P. K. Davies. T. Negas and S. Bell, Mater. Res. Bull 31(5) 1996 pp 431–437] The MO—La$_2$O$_3$—TiO$_2$ (M=Sr, Ca) ceramics covering the present patent consist of cation deficient perovskites MLa$_4$Ti$_4$O$_{15}$ (M=Sr, Ca) and Ca$_2$La4Ti$_5$O$_{18}$ belonging to the homologous series A$_n$B$_{n-1}$O$_{3n}$ (5, 6 or 8) [V. A. Saltykova, O. V. Mehikova, N. F. Fedorov, Russian J. Inorg. Chem. 34(5) 1989, p 758–759] and orthorhombic structured compounds CaLa$_4$Ti$_5$O$_{17}$ and CaLa$_8$Ti$_9$O$_{31}$ [see JCPDS files 27-1057, 27-1058, 27-1059]. The dielectric properties of these materials are being investigated for the first time.

OBJECTS OF THE INVENTION

The main object of the present invention is to provide a set of novel microwave dielectric ceramic compositions xMO-yLa$_2$O$_3$-zTiO$_2$ (M=Sr, Ca; x:y:z=1:2:4, 2:2:5, 1:2:5 or 1:4:9) and devices comprising the same which obviates the drawbacks as detailed above.

Another object of the present invention is to provide a set of novel dielectric ceramic compositions having high dielectric constant and low $\tau_\epsilon$ for capacitor applications.

Yet another object of the present invention is to provide a set of novel microwave dielectric ceramics having high dielectric constant and low $\tau_f$ for microwave substrate applications.

SUMMARY OF THE INVENTION

Accordingly the present invention provides a novel microwave dielectric ceramic composition of the general formula xMO-yLa$_2$O$_3$-zTiO$_2$ wherein M is Sr or Ca; x:y:z= 1:2:4, 2:2:5, 1:2:5 or 1:4:9. ps and devices comprising the same which comprises the manufacture of the inventive perovskites in the powder form, moulding of the powder in the suitable shape, drying, sintering and the final treatment.

In an embodiment of the present invention the dielectric ceramic compositions xCaO-yLa$_2$O$_3$-zTiO$_2$ (x:y:z=1:2:4 and 2:2:5) are prepared in cylindrical pellet shape through the solid state ceramic route by taking high purity CaCO$_3$, La$_2$O$_3$, and TiO$_2$ in the molar ratios 1:2:4 and 2:2:5, the pellets are polished, physical, structural and microwave dielectric properties are characterized. The initial firing of the mixed powders is carried out at sufficiently higher temperatures and for sufficient durations such that single-phase polycrystalline ceramics CaLa$_4$Ti$_4$O$_{15}$ and Ca$_2$La$_4$Ti$_5$O$_{18}$ are obtained.

In another embodiment of the present invention the ceramic compositions SrO—2La$_2$O$_3$—4TiO$_2$ are prepared in cylindrical pellet shape through the solid state ceramic route from high purity SrCO$_3$, La$_2$O$_3$ and TiO$_2$ in the molar ratio 1:2:4, the mixed powders are fired at different temperatures above 1200° C., the pellets are polished, physical, structural and microwave dielectric properties are characterized. The firing of the mixed oxide powders is carried out at sufficiently high temperatures for sufficient duration for getting single-phase polycrystalline ceramics of SrLa$_4$Ti$_4$O$_{15}$.

In yet another embodiment of the present invention dielectric ceramic compositions xCaO-yLa$_2$O$_3$-zTiO$_2$ (x:y:z=1:2:5 and 1:4:9) are prepared in cylindrical pellet shape through the solid state ceramic route, from a mixture of high purity CaCO$_3$, La$_2$O$_3$, and TiO$_2$ taken in the molar ratios 1:2:5 and 1:4:9 and by firing at temperatures greater than 1200° C. The pellets are polished and physical, structural and microwave dielectric properties are characterized. The firing of the mixed oxide powders is carried out at sufficiently higher temperatures for sufficient duration such that single-phase polycrystalline CaLa$_4$Ti$_5$O$_{17}$ and CaLa$_8$Ti$_9$O$_{31}$ ceramics are obtained.

The first two embodiments comprise materials with the cation deficient hexagonal perovskite structure whereas the third one comprises materials with orthorhombic structure. The AO—La$_2$O$_3$—TiO$_2$ (A=Ca, Sr) system provides ceramic materials with high dielectric constant (>40), high quality factor (>6800 at 4–5 GHz) and low temperature coefficient of resonant frequency (<±25 ppm/° C.) that can be suitably tuned for practical applications.

BRIEF DESCRIPTION OF THE DRAWINGS

For a better understanding of the invention a few exemplary embodiments are described below, considered together with the drawings, in which.

Figure 1:
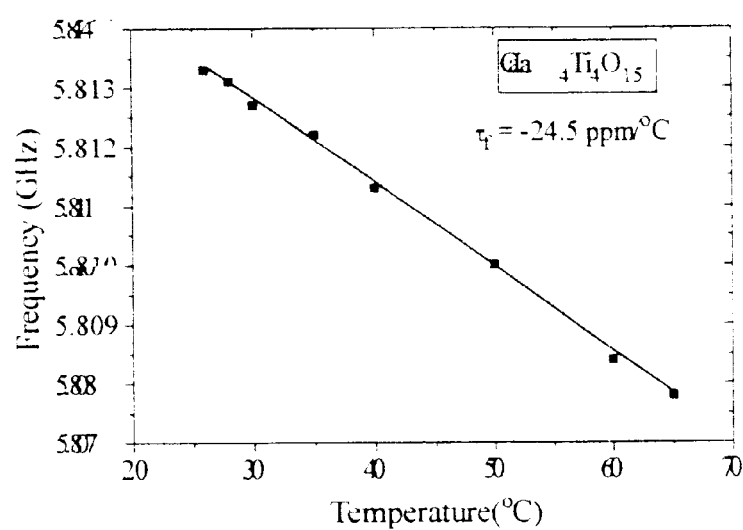
FIG. 1 shows the variation of resonant frequency with respect to temperature for a typical single-phase polycrystalline sample of CaLa$_4$Ti$_4$O$_{15}$
Figure 2:
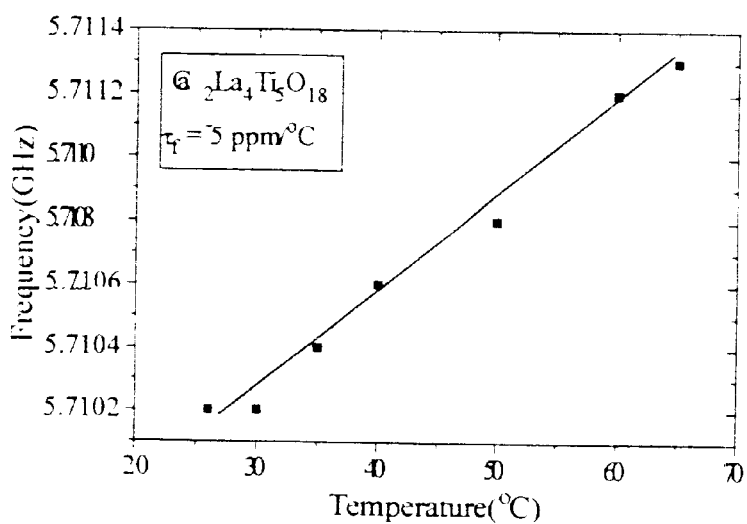
FIG. 2 shows the variation of resonant frequency with respect to temperature for a typical single-phase polycrystalline sample of Ca$_2$La4Ti$_5$O$_{18}$
Figure 3:
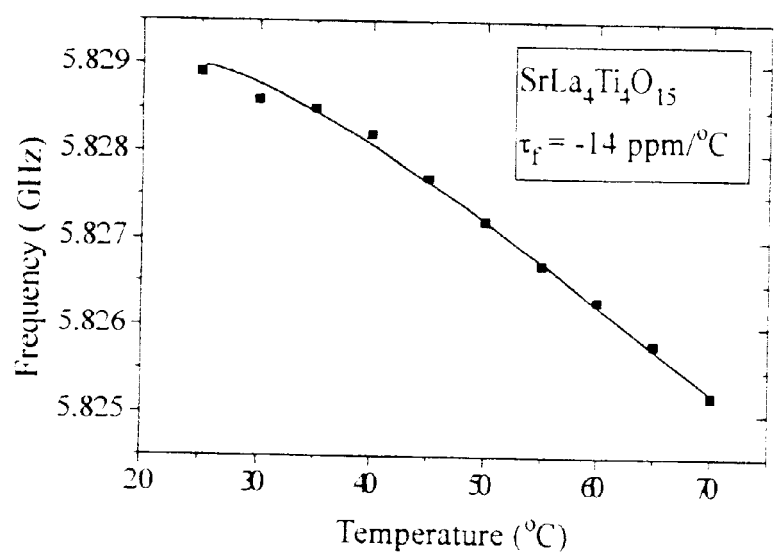
FIG. 3 shows the variation of resonant frequency with respect to temperature for a typical single-phase polycrystalline sample of SrLa$_4$Ti$_4$O$_{15}$
Figure 4:
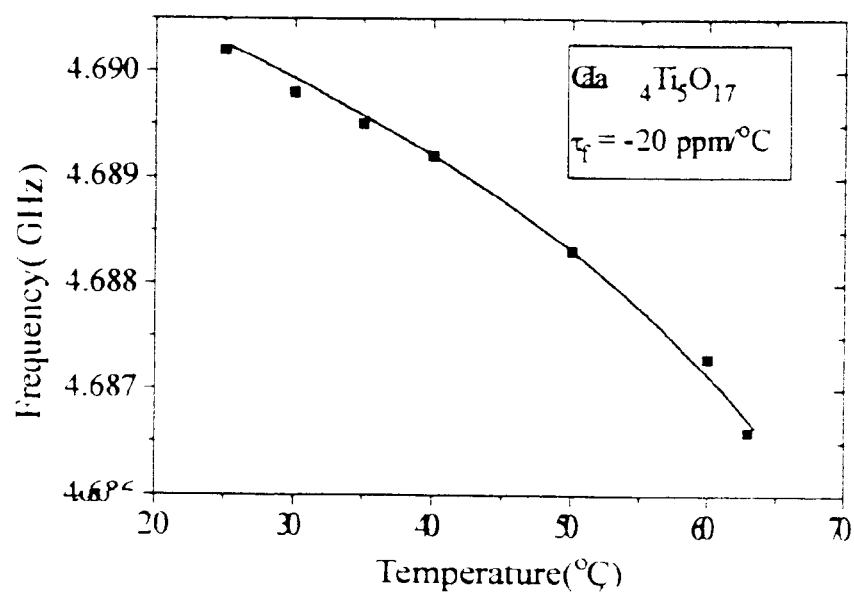
FIG. 4 shows the variation of resonant frequency with respect to temperature for a typical single-phase polycrystalline sample of CaLa$_4$Ti$_5$O$_{17}$
Figure 5:
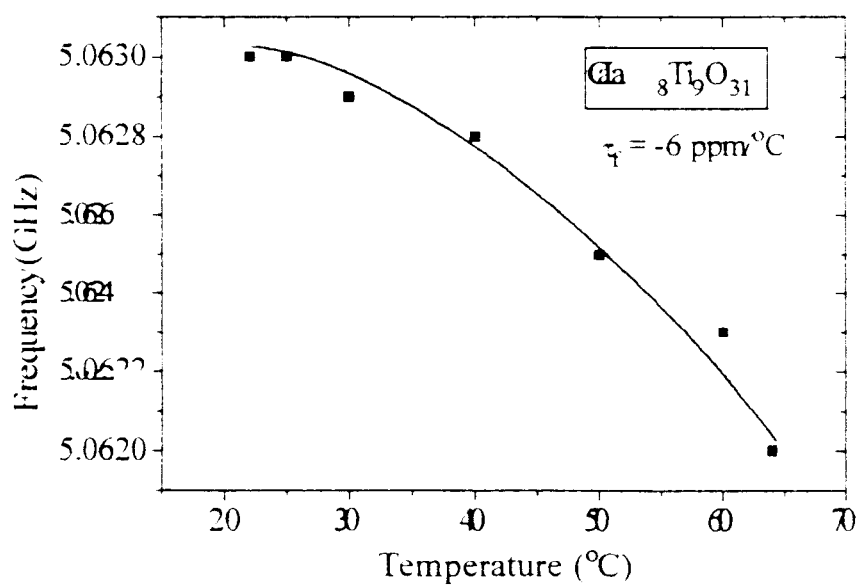
FIG. 5 shows the variation of resonant frequency with respect to temperature for a typical single-phase polycrystalline cylindrical sample of CaLa$_8$Ti$_9$O$_3$

It is to be understood that these drawings are for the purpose of illustrating the examples without limiting the scope thereof.

DETAILED DESCRIPTION OF THE INVENTION

The detailed description of this invention will now be presented with specific examples. It is to be understood that the invention is not limited to the details of the illustrated examples.

EXAMPLE 1

The compositions in the CaO—La$_2$O$_3$—TiO$_2$ system including the cation deficient hexagonal perovskites CaLa$_4$Ti$_4$O$_{15}$ and Ca$_2$La$_4$T$_5$O$_{18}$ are prepared by allowing to react the high purity CaCO$_3$, La$_2$O$_3$ and TiO$_2$ powders through the solid state ceramic route in the molar ratios 1:2:4 and 2:2:5 respectively. The powders are weighed according to the stoichiometry, ball milled for 24 hours in distilled water medium in a plastic container using zirconia balls. The mixture is dried and calcined at temperatures above 1200° C. by single or repeated calcinations for different durations and cooled to room temperature. Lesser durations at sufficiently high temperatures (usually between 1350 and 1500° C. for 2 to 8 hours) are tried to maximize the microwave dielectric properties. The calcined mixture is ground well 3 wt % PVA is added as the binder, dried and again ground. The resultant fine powder is pelletized in the appropriate size suitable for microwave measurements (6–8 mm in height and 14 mm in diameter). The careful design of dimensions of sample is a prerequisite for the accurate and optimum dielectric properties at microwave frequencies. The aspect ratio (diameter/length) should be 2–2.3 for best Q factors. The sintering of the disk or cylindrical puck shaped samples are carried out at different temperatures in the range 1550–1675° C. The sintered samples are polished well to avoid any surface irregularities and are used for measurements. The microwave dielectric constant is measured using Hakki-Coleman dielectric post resonator method. The resonator is placed between two gold-coated copper metallic plates and microwave energy is coupled through E-field probes to excite various resonant modes. Among the various resonant modes the TE$_{011}$ mode is selected for the measurement. The TE$_{011}$/TE$_{01\delta}$ modes of the above ceramics are obtained at 4–6 GHz frequencies. The quality factors of samples are measured at the TE$_{01\delta}$ mode resonant frequency using a cavity method [Jerzy Krupka, Krzytof Derzakowsky, Bill Riddle and James Baker Jarviz, Meas. Sci. Technol. 9(1998), 1751–1756]. The inner wall of the copper metallic cavity is silver coated. The sample is mounted on a cylindrical quartz crystal. The transmission mode is used for the measurements. The temperature coefficient of resonant frequency ($\tau_f$) is measured by noting the variation of TE$_{01\delta}$ mode resonant frequency with temperature (up to 75° C). The $\tau_f$ can be calculated using the formula $$\tau_f = (1/f) \times (\Delta f/\Delta T)$$

where $\Delta f$ is the variation of resonant frequency from the room temperature (usually 20° C.) resonant frequency and $\Delta T$ is the difference in temperature from room temperature. At sufficiently high temperatures (>1350° C.), for a duration of 2–8 hours single-phase al polycrystalline ceramics were obtained with >93% density. The microwave dielectric properties of the materials under Example-1 are given in Table-1. The $\epsilon_{corr}$ is the dielectric constant of the materials after applying correction for porosity

TABLE 1

Microwave dielectric properties of CaLa$_4$Ti$_4$O$_{15}$ and Ca$_2$La$_4$Ti$_5$O$_{18}$

| Material | Sample | $\epsilon_r$ | $\epsilon_{r(corr)}$ | $\tau_f$ ppm/° C. | Q | f (GHz) |
|---|---|---|---|---|---|---|
| CaLa$_4$Ti$_4$O$_{15}$ | A | 40.66 | 45.63 | −22 | 12900 ± 500 | 4.3115 |
| " | B | 41.01 | 45.37 | −21 | 11440 ± 500 | 4.1912 |
| " | C | 41.84 | 45.26 | −25 | 11754 ± 500 | 4.1072 |
| Ca$_2$La$_4$Ti$_5$O$_{18}$ | A | 44.80 | 50.71 | +6 | 7200 ± 300 | 4.1985 |
| " | B | 44.70 | 50.44 | +5 | 6819 ± 300 | 4.0886 |
| " | C | 44.77 | 50.35 | +3 | 6981 ± 300 | 4.0268 |

EXAMPLE 2

The SrLa$_4$Ti$_4$O$_{15}$ ceramics are prepared by reacting high purity SrCO$_3$, La$_2$O$_3$ and TiO$_2$ in the molar ratio (1:2:4). The preparations and characterizations are done as described in example-1. The dried mixture is calcined at 1200° C. for 4 h, ground and again calcined in the temperature range 1300–1450° C. and cooled to the room temperature. The sintering temperatures of the samples are optimized by sintering at different temperatures between 1550 and 1650° C. The initial firing of the mixed oxide powders has to be done at sufficiently high temperatures for sufficient duration in order to get a single-phase polycrystalline ceramic of $SrLa_4Ti_4O_{15}$. The sintered pellets showed density >98% except for calcination at 1500° C. where the sintered density droped to ~93%. The processing, shaping and characterization techniques are as explained in Example-1. The microwave dielectric properties of the ceramics at different calcination temperatures are given in Table-2

TABLE 2

The microwave dielectric properties of $SrLa_4Ti_4O_{15}$

| Calcination temp (° C.) | Sample | $\epsilon_r$ | $\epsilon_{r(corr)}$ | $\tau_f$ (ppm/° C.) | Q | F GHz |
|---|---|---|---|---|---|---|
| 1400 | A | 44.94 | 45.6 | −14 | 16270 ± 400 | 4.7639 |
| 1450 | A | 44.01 | 45.3 | −12 | 18580 ± 400 | 3.9978 |
| 1450 | B | 43.62 | 44.9 | −14 | 18150 ± 400 | 4.1490 |
| 1500 | A | 40.20 | 44.8 | −16 | 9010 ± 400 | 4.1880 |

EXAMPLE 3

The $CaO$—$La_2O_3$—$TiO_2$ ceramics including the single phase polycrystalline $CaLa_4Ti_5O_{17}$ and $CaLa_8Ti_9O_{31}$ are prepared by reacting high purity $CaCO_3$, $La_2O_3$, $TiO_2$ in the molar ratios 1:2:5 and 1:4:9 respectively through the solid state ceramic route. The preparation and characterization follows the steps given in the example-1. The firing involves initial calcination at 1200° C. for 4 h, grinding well and again calcining at 1350–1450° C. for different durations, optimizing sintering in the range 1600 to 1675° C. for 2–8 hours. The highly dense single-phase ceramics (>93% of theoretical density) are used for microwave measurements.

TABLE 3

The microwave dielectric properties of $CaLa_4Ti_5O_{17}$ and $CaLa_8Ti_9O_{31}$

| Material | Sample | $\epsilon_r$ | $\epsilon_{r(corr)}$ | $\tau_f$ ppm/° C. | Q | f GHz |
|---|---|---|---|---|---|---|
| $CaLa_4Ti_5O_{17}$ | A | 53.75 | 54.4 | −18 | 7094 ± 300 | 3.6741 |
| " | B | 54.11 | 54.7 | −17 | 7120 ± 300 | 3.5210 |
| " | C | 54.0 | 54.5 | −20 | 7132 ± 300 | 3.5593 |
| $CaLa_8Ti_9O_{31}$ | A | 48.5 | 56.1 | −4 | 7714 ± 300 | 3.7298 |
| " | B | 48.8 | 56.0 | −6 | 7975 ± 300 | 3.6529 |

EXAMPLE 4

In order to study the performance of the dielectric resonator in actual working environments such as a filter, one dielectric resonator sample of CaLa4Ti4O15 was placed on PTFE substrate inside a copper cavity. The working of the set up was like a band rejection filter at resonant frequency. The microwave power was coupled to the cavity through a copper strip line of 3 mm width and impedance of 50 Ω. When the dielectric resonator was placed in the vicinity of a microstrip line on the PTFE substrate, magnetic coupling between the resonator and the line was caused. The cavity is rectangular with 50 mm×50 mm size with a depth of 30 mm. A metallic disc that can be moved up or down to tune the frequency. The PTFE substrate has a dielectric constant of 2.2 and height of the substrate is 1.8456 mm. The specifications of the sample used are: Dielectric constant=41; Diameter of sample=11.42 mm; Height=4.63 mm; D/L ratio=2.466

Figure 6:
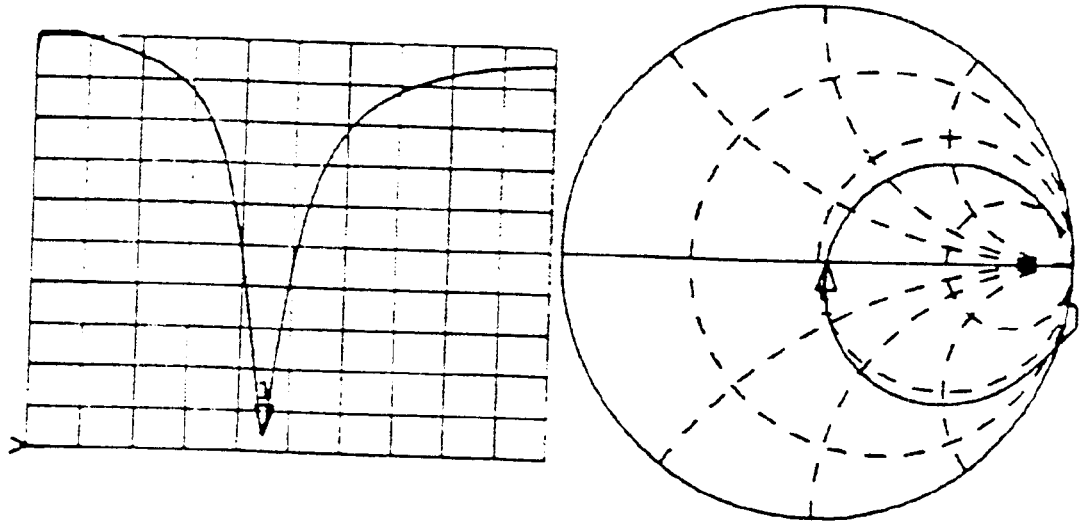
FIG. 6 shows the resonant curve and the corresponding Smith chart of the dielectric resonator in actual working set up.

The principal resonant mode is $TE_{01\delta}$ mode. In order to minimise the effect of spurious modes on the principal mode usually a D/L ratio of 2–2.5 is good where D is the diameter and L the length of the cylindrical resonator. For narrow band width DR filters extremely high quality factor dielectric resonators are needed. The actual Q of the DR is obtained by subtracting the coupler losses. The losses due to the mounting fixture and the surrounding evanescent mode wave guide reduce the Q factor of the actual filter. The actual filter circuits employ more than one dielectric resonator, such that as the number of resonators increases, the skirt of the filters frequency response becomes steeper and out of band rejection increases. The quality factor of the resonant structure is measured to be 7100 at 4.764 GHz. The measurement set up works like a band rejection filter circuit and therefore provides an idea as to the performance of the dielectric resonator in actual working environment. The resonant curve and the corresponding Smith chart are given in FIG. 6.

The main advantage of the present invention is that the inventive system provides dielectric resonator materials having high dielectric constant (>40), high quality factor (>6800 at 4–5 GHz) and low temperature coefficient of resonant frequency (<±125 ppm/° C.) suitable for practical applications. The microwave dielectric properties may suitably be modified by adding, substituting or varying the content of $TiO_2$ or by forming solid solutions with other hexagonal or orthorhombic structures microwave dielectrics, that also come under the wide scope of the present patent. The ceramics can better replace the current material employed for applications requiring narrow bandwidth and extremely small insertion loss (<0.3 dB) without compromise in quality especially at <2 GHz. The purity of chemicals and type of impurities (even traces), slight changes in processing temperatures considerably affect the formation and abundance of different possible phases. The rate of cooling and annealing at lower temperatures are found to affect the dielectric properties. Hence it may be understood that the patent is not limited to the exemplary embodiment, but a person skilled in the art may make variations and modifications without departing from the spirit and scope of the invention. As an example, slight changes in composition by the addition or deficiency of $TiO_2$, or the presence of Zr or Si can affect the microwave dielectric properties. All such variations and modifications are intended to be included within the scope of the claims.

What is claimed is:

1. A sintered microwave dielectric ceramic composition of the formula $xMO$-$yLa_2O_3$-$zTiO_2$ wherein M is selected from Sr and Ca and x:y:z=1:2:4, 2:2:5, 1:2:5 or 1:4:9, and wherein the sintered composition has a dielectric constant greater than 40, a temperature coefficient of resonant frequency between +30 and −30 ppm/° C. and a high quality factor of greater than 6800 at 4–5 GHz.

2. Microwave dielectric ceramic composition as claimed in claim 1 wherein M is Ca and x:y:z is in the range of 1:2:4 and 2:2:5.

3. Microwave dielectric ceramic composition as claimed in claim 1 wherein the composition is in single-phase polycrystalline form and is of the formula $CaLa_4Ti_4O_{15}$.

4. Microwave dielectric ceramic composition as claimed in claim 3 being in single-phase polycrystalline form and having dielectric constant between 40 and 57 with high quality factor with temperature coefficient of resonant frequency between −25 and 10 ppm/° C.

5. Microwave dielectric ceramic composition as claimed in claim 1 wherein the composition is in single-phase polycrystalline form and is of the formula $Ca_2La_4Ti_5O_{18}$.

6. Microwave dielectric ceramic composition as claimed in claim 1 wherein M=Ca and x:y:z is 1:2:5 or 1:4:9.

7. Microwave dielectric ceramic composition as claimed in claim 1 wherein the composition is in single-phase polycrystalline form and is of the formula $CaLa_4Ti_5O_{17}$.

8. Microwave dielectric ceramic composition as claimed in claim 1 wherein the composition is in single-phase polycrystalline form and is of the formula $CaLa_8Ti_9O_{31}$.

9. Microwave dielectric ceramic composition as claimed in claim 1 wherein M=Sr and x:y:z=1:2:4.

10. Microwave dielectric ceramic composition as claimed in claim 1 wherein the composition is in single-phase polycrystalline form and is of the formula $SrLa_4Ti_4O_{15}$.

11. Microwave dielectric ceramic composition as claimed in claim 1 wherein the composition contains a dopant selected from $TiO_2$, $ZrO_2$, $SiO_2$ and cation deficient perovskites in the layered structure.

12. Dielectric resonators for use in microwave telecommunication systems comprising the microwave dielectric resonator materials according to claim 1.

13. Dielectric resonators of claim 12 comprising a substrate fabricated with the dielectric material and a plurality of conductors forming a conductor pattern on one or more surfaces of the substrate.

14. The dielectric resonator of claim 12 comprising a block of the dielectric material coated with a metal electrode.

15. A dielectric filter for use in microwave telecommunication system comprising a plurality of resonators according to claim 12.

16. Substrate for microwave applications comprising the dielectric materials as claimed in claim 1.

17. Capacitors made up of the dielectric materials as claimed in claim 1.

18. Dielectric resonator antennas made up of dielectric materials as claimed in claim 1.

19. Radio frequency devices comprising the ceramic compositions as claimed in claim 1.

20. A method for the fabrication of a dielectric composition of the formula $xMO-yLa_2O_3-zTiO_2$ wherein M is selected from Sr and Ca and x:y:z=1:2:4, 2:2:5, 1:2:5, or 1:4:9, the method comprising mixing, firing and shaping powders of $CaCO_3$ or $SrCO_3$, $TiO_2$, and $La_2O_3$ to form a mass of dielectric material; and firing the mass at a temperature above 1200° C. and for a time period sufficient, and cooling to a temperature greater than or equal to room temperature so that the materials have dielectric constants greater than 40 at microwave frequencies and at a temperature of 25° C. and $\tau_f$ between −25 and +20 ppm/° C.

21. The method of claim 20 wherein the firing of the shaped material is in the range 1550 and 1675° C.

22. The method of claim 21 wherein the samples are annealed between 1200 and 1500° C. for a duration greater than or equal to 6 hours.

23. The method of claim 20 wherein the cooling is done very slowly at a rate less than or equal to 5° C. per minute.

* * * * *